(12) United States Patent
Shu et al.

(10) Patent No.: US 12,373,617 B1
(45) Date of Patent: Jul. 29, 2025

(54) PLP OPTIMIZED PLACEMENT METHOD FOR A WIND FARM OF PLATEAU-MOUNTAIN REGION

(71) Applicant: Kunming University of Science and Technology, Kunming (CN)

(72) Inventors: Hongchun Shu, Kunming (CN); Yutao Tang, Kunming (CN); Yiming Han, Kunming (CN); Baisong Liu, Kunming (CN); Yue Dai, Kunming (CN); Weijie Lou, Kunming (CN); Haoming Liu, Kunming (CN)

(73) Assignee: KUNMING UNIVERSITY OF SCIENCE AND TECHNOLOGY, Kunming (CN)

( * ) Notice: Subject to any disclaimer, the term of this patent is extended or adjusted under 35 U.S.C. 154(b) by 0 days.

(21) Appl. No.: 19/026,495

(22) Filed: Jan. 17, 2025

(30) Foreign Application Priority Data

Aug. 5, 2024 (CN) .......................... 202411060919.X (51) Int. Cl.
*G06F 30/20* (2020.01)
*G01B 21/16* (2006.01)
*G01C 5/00* (2006.01)
*G06F 17/11* (2006.01)
*G06F 113/06* (2020.01)

(52) U.S. Cl.
CPC ............ *G06F 30/20* (2020.01); *G01B 21/16* (2013.01); *G01C 5/00* (2013.01); *G06F 17/11* (2013.01); *G06F 2113/06* (2020.01)

(58) Field of Classification Search
CPC ...... G06F 30/20; G06F 17/11; G06F 2113/06; G01B 21/16; G01C 5/00
USPC .......................................................... 703/2
See application file for complete search history.

(56) References Cited

U.S. PATENT DOCUMENTS

| 2017/0214232 A1* | 7/2017 | Aspas Puertolas .... H02G 13/00 |
| 2025/0059956 A1* | 2/2025 | Madsen ................ F03D 17/028 |
| 2025/0102575 A1* | 3/2025 | Putrams ................. F03D 17/00 |

* cited by examiner

*Primary Examiner* — Andre Pierre Louis
(74) *Attorney, Agent, or Firm* — Bayramoglu Law Offices LLC (57) ABSTRACT

An optimized PLP placement method for plateau and mountain wind farms is provided. Starting from the outermost wind turbines, it measures turbine parameters. Firstly, install the first PLP to safeguard the outermost ones. Then, combine its parameters with those of the tallest turbine near the center to set up the second PLP, protecting turbines within a connection range. Next, use the previous step's parameters and those of the tallest turbine in the vertical area of the first two PLPs' plane to install the third PLP, shielding turbines in the area formed by three points. Repeat until covering the whole farm. Many cases prove its reliability, economy and suitability for wide application in optimizing PLP placement.

5 Claims, 8 Drawing Sheets

PLP OPTIMIZED PLACEMENT METHOD FOR A WIND FARM OF PLATEAU-MOUNTAIN REGION

CROSS REFERENCE TO THE RELATED APPLICATIONS

This application is based upon and claims priority to Chinese Patent Application No. 202411060919.X, filed on Aug. 5, 2024, the entire contents of which are incorporated herein by reference.

TECHNOLOGY FIELD

This invention belongs to the field of lightning protection for power systems, and specifically relates to a PLP optimal layout method for wind farms in plateau and mountainous areas.

BACKGROUND

Figure 2:
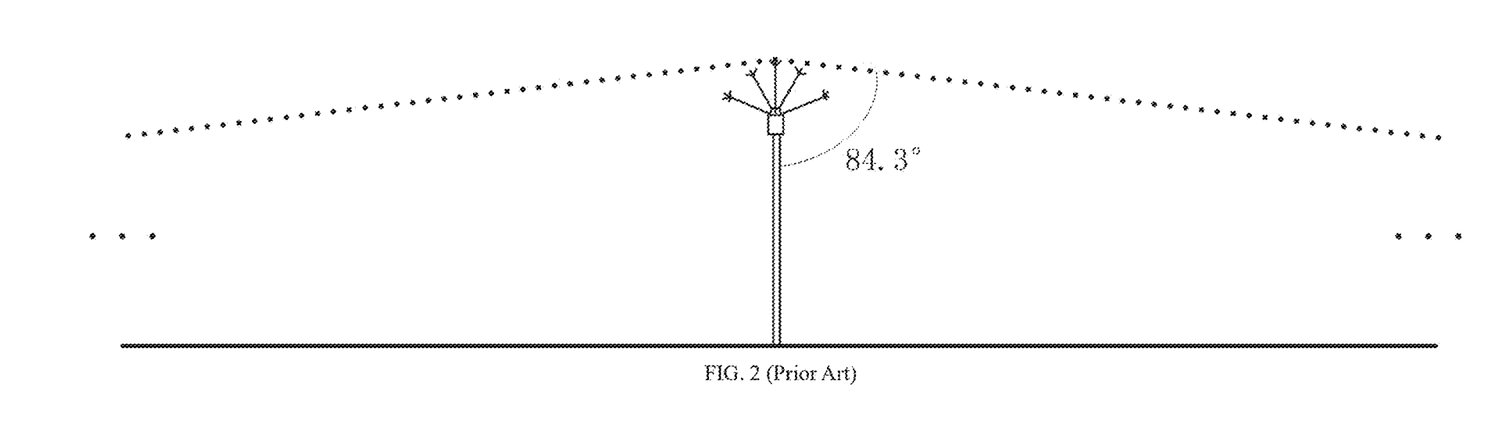
FIG. 2 is the schematic diagram of the protection range of the PLP device and its installation regulations.

The new lightning protection device—Plasma Lightning Protector (PLP) has a good effect in lightning protection. With the "quasi-point effect", its own electric field strength under the thundercloud is two orders of magnitude higher than that of the protected object, thus attracting and gathering the charges of the thundercloud and making the protected target in a safe position with a relatively low electric field. It also adopts the induction array lightning rod and the dielectric barrier strong ionization composite discharger, utilizes the electric field of the thundercloud to achieve passive strong ionization, and generates high-concentration plasma by the strong ionization discharger and emits it bidirectionally between the cloud and the ground, efficiently neutralizing the thundercloud charges attracted by the lightning rod, thus solving the fatal problem that the self-shielding effect of the electric field of the traditional lightning eliminator array needles suppresses the increase of the divergent current and makes it easy to be broken down by lightning. Under the attraction of the electric field of the thundercloud and the ground reverse polarity electric field induced by it, the positive (negative) ions in the plasma drift upward to neutralize the negative (positive) ions of the thundercloud above the needle tip, and the negative (positive) ions in the plasma drift downward to neutralize the positive (negative) ions induced by the thundercloud below the needle tip. It continuously attracts and gathers the negative (positive) ions of the thundercloud and the positive (negative) ions induced by it around the discharger body and bidirectionally neutralizes them, making the equivalent capacitance plates between the thundercloud and the ground leak electricity efficiently and become "bad capacitors" that cannot be charged to the electric field strength required for the formation of the lightning leader and its development into the subsequent breakdown discharge. Its protection angle and protection radius are much larger than those of the traditional lightning rod, as shown in FIG. 2. The distribution of wind turbines in a wind farm is generally spaced at 3 to 5 times the impeller diameter. However, due to the undulating terrain of the plateau and mountainous areas, it is difficult to keep the installed wind turbines at the same horizontal height. When using PLP to protect them, it is necessary to comprehensively consider reliability (the protection range covers all wind turbines) and economy (using a smaller number and a lower installation height) for the layout.

The calculation method of the protection range in the PLP installation regulations calculates the PLP protection range based on the protection angle. If the PLP is installed to protect wind turbines with a height of hundreds of meters by this method, it does not conform to the striking distance theory of the electrical geometry model, and protection loopholes are likely to occur at an altitude above 60 m. Therefore, it is urgent to combine the protection range of PLP with the striking distance theory and propose a PLP optimal layout method applicable to wind farms to achieve reliable protection of wind farms. However, due to the generally large undulations of the surface in plateau and mountainous wind farms, it is difficult to calculate and layout simply, and it is not easy to balance reliability and economy.

SUMMARY

Figure 3:
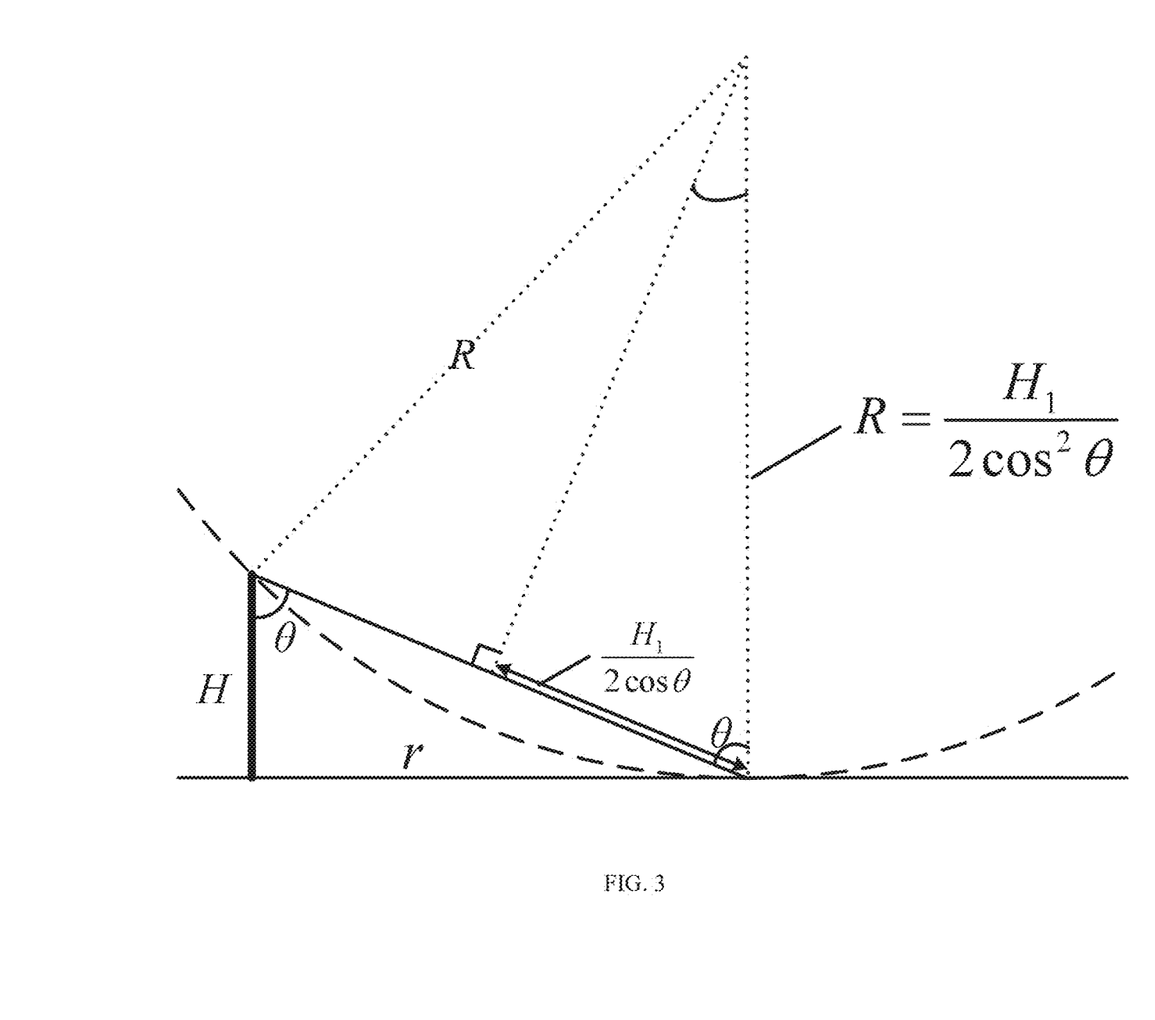
FIG. 3 is a geometric schematic diagram on which formulas (2) and (4) are based.
Figure 4:
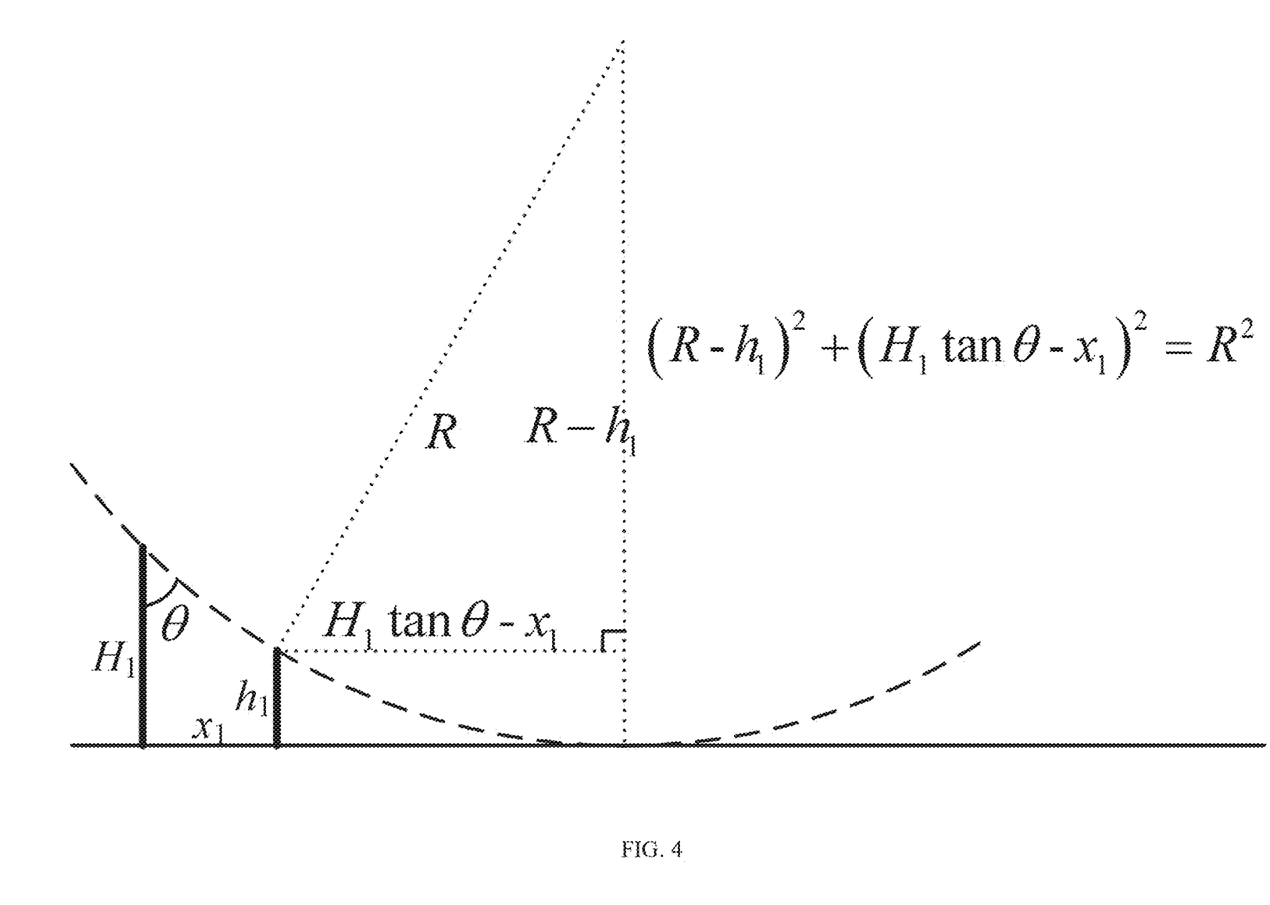
FIG. 4 is a geometric schematic diagram on which formula. (3) is based.
Figure 5:
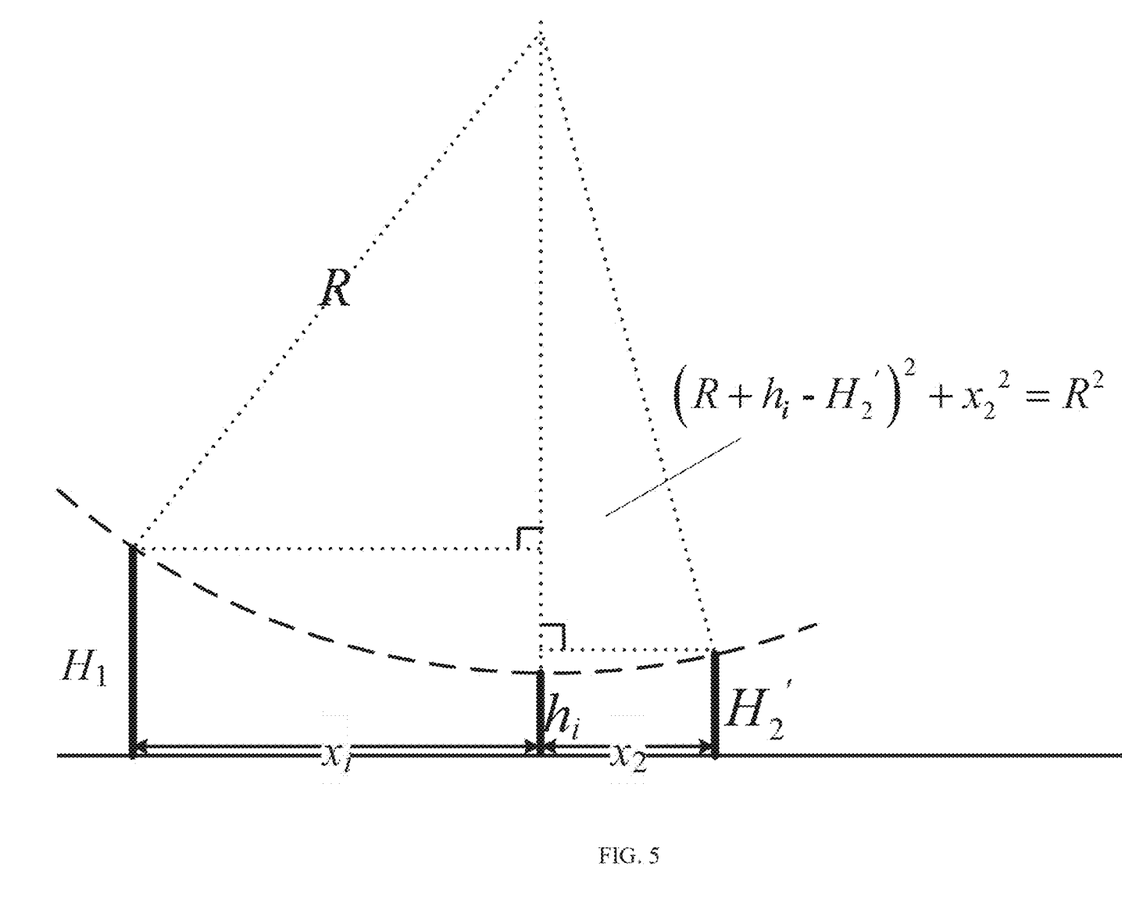
FIG. 5 is a geometric schematic diagram on which formula. (5) is based.
Figure 6:
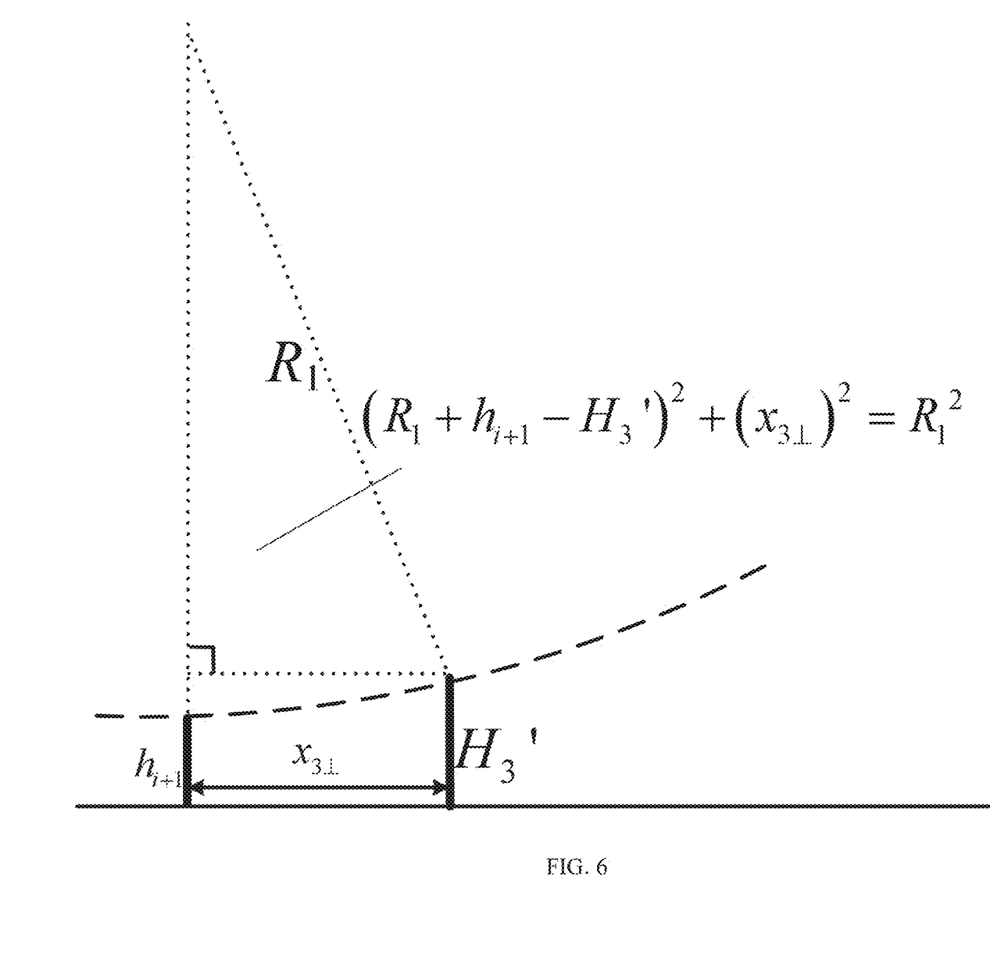
FIG. 6 is a geometric schematic diagram on which formula. (8) is based.

In view of the above technical deficiencies, the present invention provides a PLP optimal layout method for wind farms in plateau and mountainous areas, which includes:

step1: starting from the outermost wind turbines in the wind farm, measuring and calculating the parameters of the wind turbines;

counting the height $h_w$ of the wind turbines in a wind farm and their distribution range. starting from the outermost wind turbines in the wind farm, look for the highest terrain position in the area towards the center of the wind farm as the first installation point of the PLP. according to the terrain position index, the position where the ratio of the topographic position index (TPI) in the area to the elevation difference of the target neighborhood is the largest is the highest terrain position. measuring the surface height difference $\Delta h_1$ between the highest terrain point and the bottom of the outermost wind turbine and the horizontal distance $x_1$ between the two points.

calculating the relative height difference $h_1$ of the wind turbine.

$$h_1 = h_w - \Delta h_1 \tag{1}$$

step 2: installing the first PLP to protect the outermost wind turbine;

calculating the height difference $H_1$ between the tip of the PLP at the first installation point and the ground, install the first PLP accordingly, and determining the radius R of the protection surface.

the minimum height difference $H_1$ between the tip of the PLP at the first installation point and the ground as well as R are solved by simultaneously solving the following equations:

$$R = \frac{H_1}{2\cos^2\theta} \tag{2}$$

$$(R-h_1)^2 + (H_1\tan\theta - x_1)^2 = R^2 \tag{3}$$

where θ is the protection angle provided by the PLP installation regulations, and its value range is from 84° to 86°. The above formula is obtained based on the principles described in Attached FIGS. 3-4.

step3: combining the parameters of the first PLP and the parameters of the tallest wind turbine within the area dose to the central side of the wind farm, and installing the second PLP to protect the wind turbines within the connection range;

taking the installation point of the first PLP as the base point, search for the tallest wind turbine $f_1$ in the sector area with a horizontal radius r in the direction of the center of the wind farm. measuring and calculating the horizontal distance $x_1$ between the tallest wind turbine $f_1$ and the installation point of the first PLP, as well as the surface height difference $\Delta h_i$ between the tallest wind turbine $f_1$ and the installation point of the first PLP, and then calculating the relative height difference $h_i$, $h_i = h_w - \Delta h_i$. looking for the highest terrain point on the ray from the base point to the tallest wind turbine $f_1$ within the range of $x_i$ to 2r from the base point. measuring the horizontal distance $x_2$ between this highest terrain point and the tallest wind turbine $f_1$, and the surface height difference $\Delta h_2$ between this highest terrain point and the base point. calculating the relative height difference $H_2'$ of the tip of the PLP at this highest terrain point, and calculating the height difference $H_2 = H_2' - \Delta h_2$ between the tip of the PLP at this highest terrain point and the ground. installing the second PLP and updating the radius of the protection surface to $R_1$.

where the horizontal radius r is calculated by the following formula, which is obtained based on the principle described in FIG. 3:

$$r = H_1 \tan\theta \quad (4)$$

the relative height difference $H_2'$ of the tip is calculated by the following formula, which is obtained based on the principle described in FIG. 5:

$$(R + h_i - H_2')^2 + x_2^2 = R^2 \quad (5)$$

updating the radius $R_1$ of the protection surface through the height of the base point object from the ground and the height of the required PLP from the ground:

$$R_1 = \frac{H_1 + H_2}{4\cos^2\theta} \quad (6)$$

formula (6) embodies the idea of the "Gauss-Seidel iterative method". by updating each solution result as the known solution for the next solving process, the accuracy of the overall calculation can be improved.

step4: combining the parameters from the previous step and the parameters of the tallest wind turbine in the vertical direction area of the plane where the first and second PLPs are located, and installing the third PLP to protect the wind turbines within the area formed by the three points;

taking the tallest wind turbine $f_1$ in step3 as the new base point, updating the horizontal radius to $r_1$, and looking for the tallest wind turbine $f_2$ in the sector area in the direction of the perpendicular bisector of the plane where the first and second PLP installation points are located. measuring the horizontal distance $x_{i+1}$ between the tallest wind turbine $f_2$ and the new base point, as well as the surface height difference $\Delta h_{i+1}$ between the tallest wind turbine $f_2$ and the new base point, and calculating the relative height difference $h_{i+1}$, $h_{i+1} = h_w - \Delta h_{i+1}$ looking for the highest terrain point on the perpendicular bisector within the range of $x_{i+1}$ to 2r from the base point. measuring the horizontal distance $x_{i+1}$ between this highest terrain point and the tallest wind turbine $f_2$, and the surface height difference $\Delta h_3$ between this highest terrain point and the new base point. calculating the relative height difference $H_3'$ of the tip of the PLP at this point and the height difference $H_3$ between the tip of the PLP at this point and the ground, where $H_3 = H_3' - \Delta h_3$. installing the third PLP and updating the radius of the protection surface to $R_2$;

the horizontal distance $x_3$ includes the vertical parameter $x_3$ and the parallel parameter $x_{3//}$. where "vertical" and "parallel" are in relation to the plane where the first and second PLPs are located;

updating the horizontal radius $r_1$ according to the following formula:

$$r_1 = \frac{(h_w + H_2)}{2}\tan\theta \quad (7)$$

the relative height difference $H_3'$ of the tip is calculated according to the following formula:

$$(R_1 + h_{i+1} - H_3')^2 + (x_{3\perp})^2 = R_1^2 \quad (8)$$

the principle is as described in FIG. 6, which considering that the tallest wind turbine in the sector area is not necessarily on the perpendicular bisector, here its relative height difference $h_{i+1}$ is applied in the direction of the perpendicular bisector and substituted into equation (8) for calculation, so that a certain margin is reserved for the protection range of the obtained result.

updating the radius $R_2$ of the protection surface through the height of the base point object from the ground and the height of the sought PLP from the ground:

$$R_2 = \frac{h_w + H_3}{4\cos^2\theta} \quad (9)$$

step 5: repeating the operation in the previous step and installing PLPs until the entire wind farm is covered.

taking the tallest wind turbine $f_2$ in step4 as the base point, repeating the operation in step4 and installing the next PLP. keeping repeating this process until the entire wind farm is covered.

BENEFICIAL EFFECTS

1. In this invention, the lightning striking distance theory is applied to the calculation of the protection range of the Plasma Lightning Protector (PLP), which makes up for the limitations of the original calculation method for the protection range of the PLP, makes the protection more reliable and economical, and also remedies the defect that the lightning striking distance theory fails to provide a calculation method for the protection range of relatively tall objects (higher than 60 m).
2. This invention is not limited to a certain type of terrain. It can reasonably apply the PLP to lightning protection in wind farms and can also be used for lightning protection in other similar scenarios. It takes into account both reliability and economy. While the protection range covers all wind turbines, the number of PLPs used is relatively small and the installation height is relatively low.
3. In this invention, the wind farm is comprehensively covered following the idea of points, lines and surfaces. The calculation process is simple and reliable, and there is no need to consider and calculate each wind turbine in the wind farm point by point.

BRIEF DESCRIPTION OF THE DRAWINGS

In order to illustrate the technical solutions in the embodiments of the present invention or in the prior art more clearly, the accompanying drawings required for use in the description of the embodiments or the prior art will be briefly introduced below. Obviously, the accompanying drawings described below are just some embodiments of the present invention. For those of ordinary skill in the art, other accompanying drawings can also be obtained based on these accompanying drawings without performing creative work.

DETAILED DESCRIPTION OF THE EMBODIMENTS

The following will dearly and completely describe the technical solutions in the embodiments of the present invention in combination with the accompanying drawings in the embodiments of the present invention. Obviously, the described embodiments are only a part of the embodiments of the present invention, rather than all of them. Based on the embodiments of the present invention, all other embodiments obtained by those of ordinary skill in the art without creative work fall within the protection scope of the present invention.

EMBODIMENT

Figure 1:
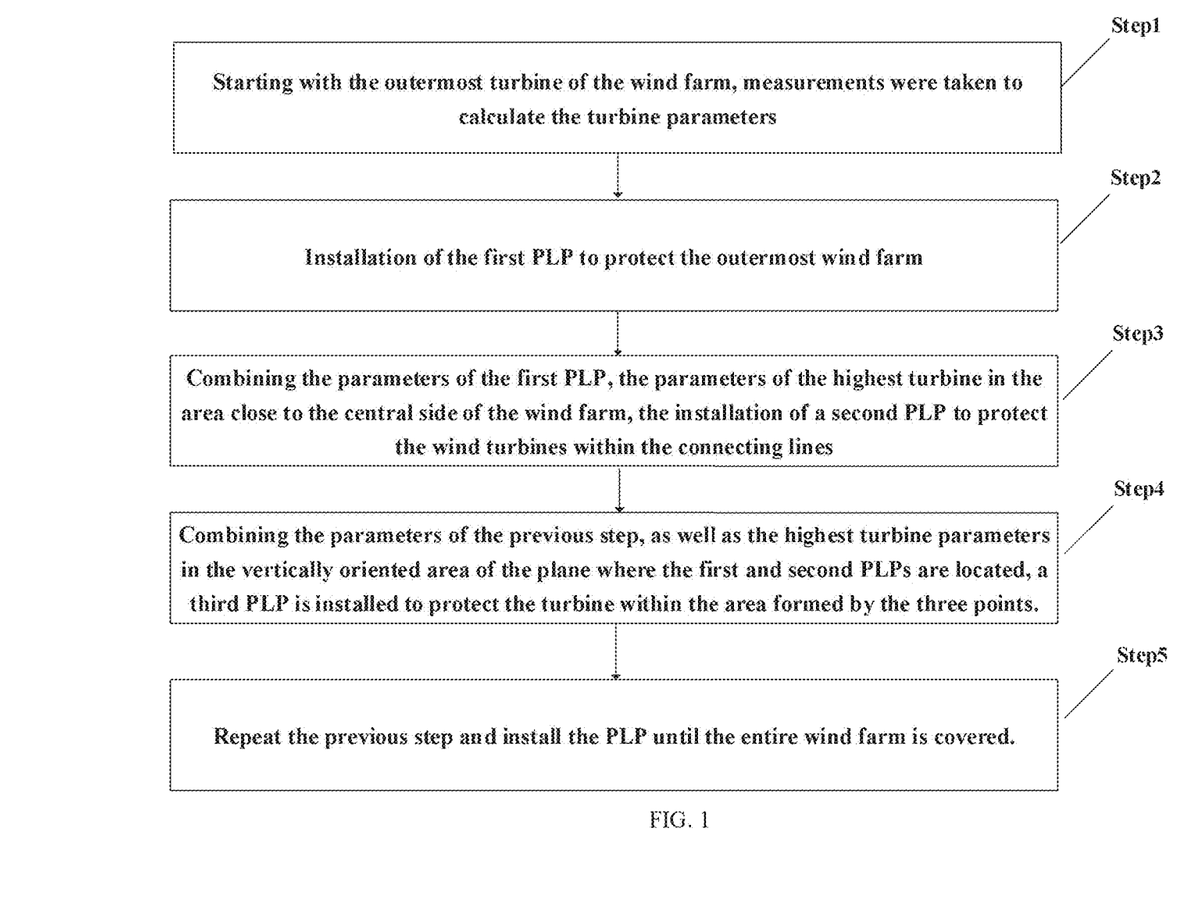
FIG. 1 is the flowchart of the method of the present invention.

As shown in FIG. 1, the present invention provides an optimized placement method for Plasma Lightning Protectors (PLPs) in a plateau and mountain wind farm. Points are placed step by step according to the steps of points, lines and surfaces until the entire wind farm is covered. It includes:
step1: starting from the outermost wind turbines in the wind farm, measuring and calculating the parameters of the wind turbines;
step2: installing the first PLP to protect the outermost wind farm;
step3: combining the parameters of the first PLP and the parameters of the tallest wind turbine within the area close to the central side of the wind farm, and installing the second PLP to protect the wind turbines within the connection range;
step4: combining the parameters from the previous step and the parameters of the tallest wind turbine in the vertical direction area of the plane where the first and second PLPs are located, and installing the third PLP to protect the wind turbines within the area formed by the three points;
step5: repeating the operation in the previous step and installing PLPs until the entire wind farm is covered.

Where step1 to step2 are to protect the outermost wind turbines in the wind farm by using a single PLP, which is the "point" protection. step3 combines the previous PLP to select the position and height of the second PLP to protect the wind turbines between the two points connected by a line, which is the "line" protection. step4 combines the first two PLPs to determine the position and height of the PLP on the side of the line connecting them to protect the wind turbines in the area formed by the three points, which is the "face" protection. The objective of the present invention can also be achieved by other methods or formulas under this idea. Moreover, an iterative method can be used along with the placement idea of the method of the present invention to seek a better solution.

Figure 7:
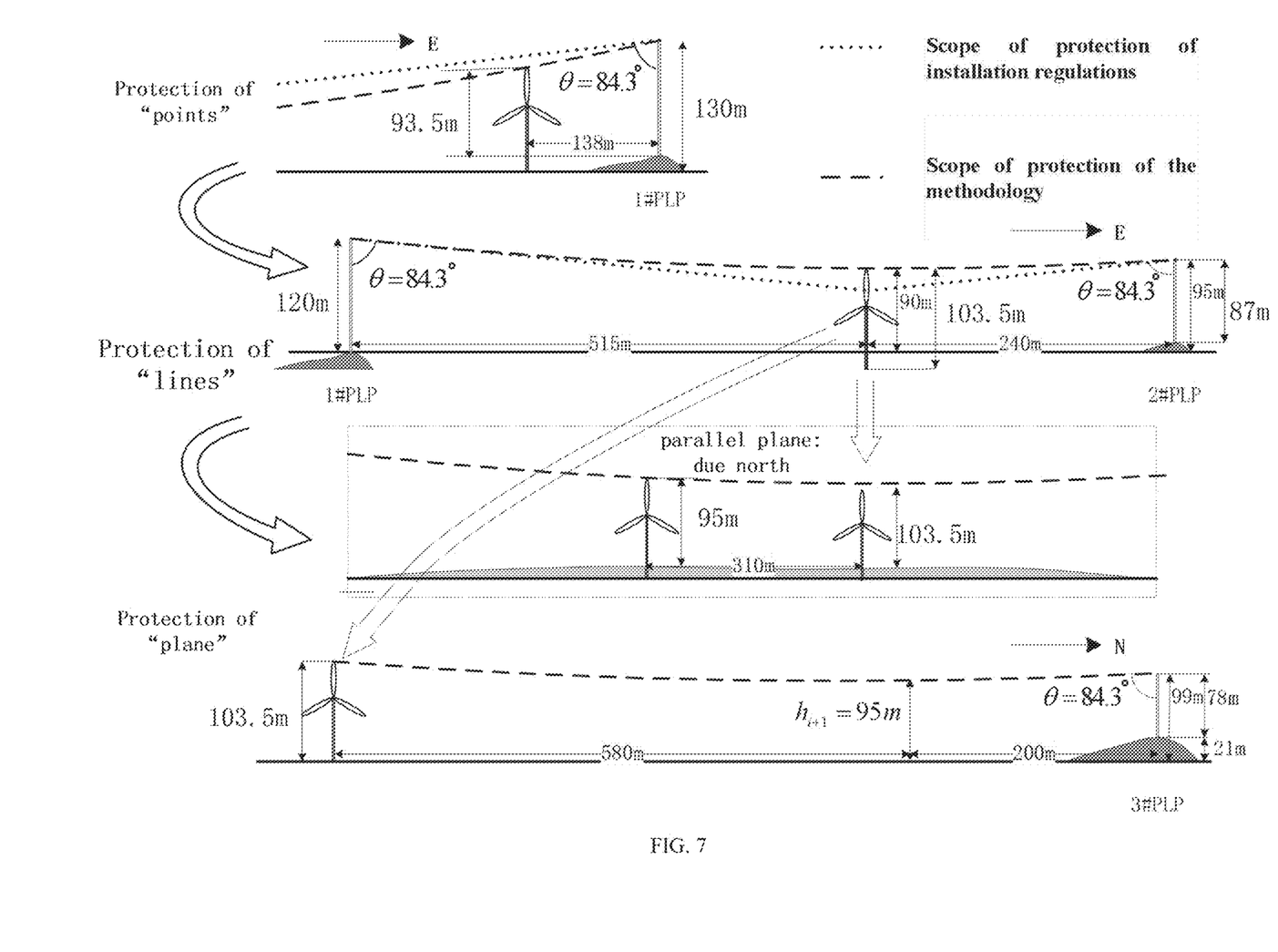
FIG. 7 is an illustration diagram of an implementation example of the optimized placement of PLPs in a wind farm.
Figure 8:
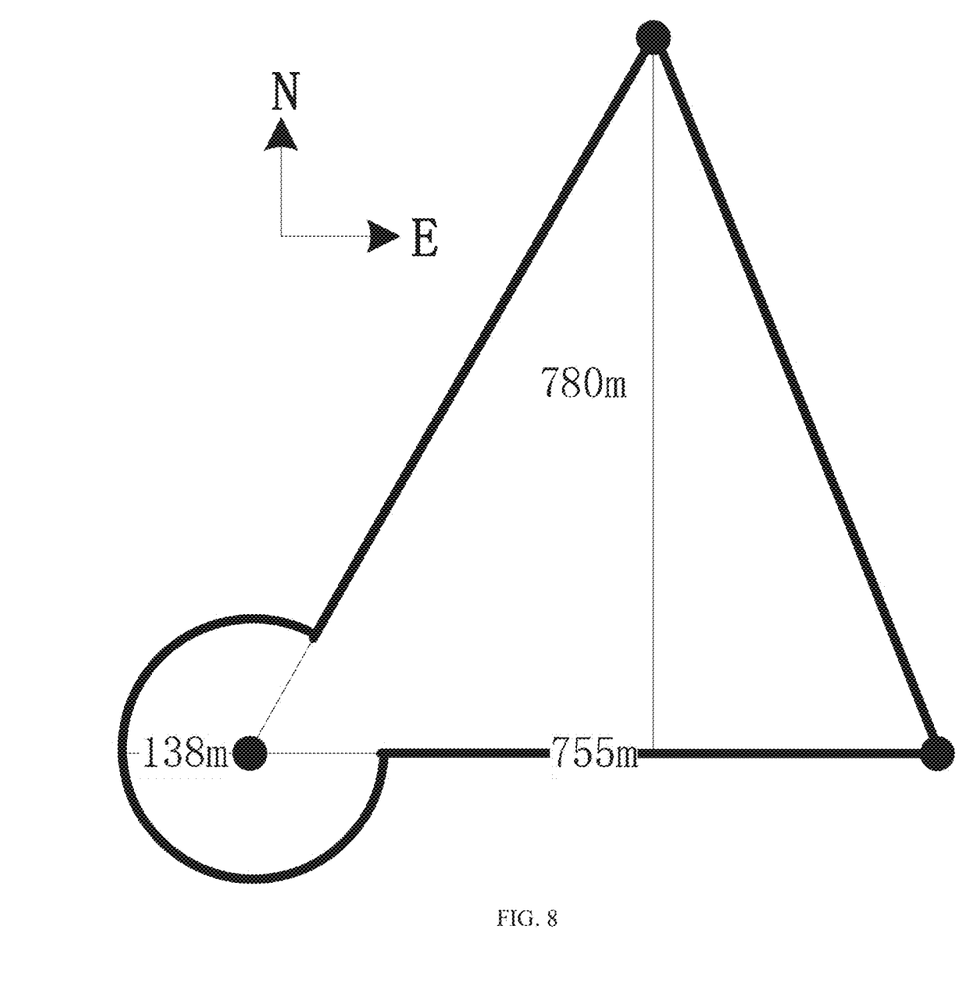
FIG. 8 is a top view of FIG. 7.

Specifically, as shown in FIGS. 7-8, the wind turbines in an area of the wind farm can be reliably protected through the rational placement of PLPs. There is also a comparison between the method of the present invention and the method described in the PLP installation regulations, including the following specific steps:
step1. statistically analyze the distribution range of the wind farm. for the sake of economy and technical uniformity, most wind farms usually choose wind turbines of the same model and size. Obtain the height of the wind turbine $h_w=103.5$ m. starting from the westernmost wind turbine in the wind farm, look for the highest terrain position within the area towards the center of the wind farm (due east). this position is taken as the installation point of the first PLP. measuring the surface height difference $\Delta h_1 -10$ m between this highest terrain point and the bottom of the outermost wind turbine as well as the horizontal distance $x_1$-138 m between the two points. assuming that the radius of the protection surface of the PLP is R, and calculating the relative height difference of the wind turbine, which is $h_1=h_w-\Delta h_1=93.5$ m;
step2. combine equations (2-3) to calculate the height difference $H_1=120$ m between the tip of the PLP at the first installation point and the ground. installing the first PLP accordingly, as shown in FIG. 7. the protection angle $\theta$ is taken as 84.3° recommended by the PLP installation regulations, and the radius R of the protection surface is determined to be 6060 m;

$$R = \frac{H_1}{2\cos\theta} \quad (2)$$

$$(R-h_1)^2+(H_1 \tan \theta-x_1)^2=R^2 \quad (3)$$

step3. taking the first PLP as the base point, find the tallest wind turbine $f_1$ (due east) within the sector area with a horizontal radius $r=H_1 \tan 9=1200$ m in the direction of the center of the wind farm. measuring and calculating the horizontal distance $x_i=515$ m and the relative height difference $h_i=90$ m between the tallest wind turbine $f_1$ and the installation point of the first PLP. looking for the highest terrain point on the ray from the base point pointing to this wind turbine $f_1$ within the range of $x_i$ to $2r$ from the base point. measuring the horizontal distance $x_2=240$ m between this point and the tallest wind turbine $f_1$, calculate the relative height difference $(R+h_i-H_2')^2+x_2^2=R^2$, $H_2'=95$ m of the PLP at this point, subtracting the surface height difference $\Delta h_2=8$ m between this point and the base point to obtain the height difference $H_2=87$ m between the tip of the PLP and the ground. installing the second PLP and updating the radius $$R_1 = \frac{H_1+H_2}{4\cos^2\theta} = 5227m$$

of the protection surface.

step4: taking the tallest wind turbine $f_1$ in the previous step as the new base point, updating the horizontal radius $$r_1 = \frac{(h_w + H_2)}{2} \tan\theta.$$

looking for the tallest wind turbine $f_2$ within the sector area in the direction of the perpendicular bisector (due north) of the plane where the first and second PLPs are located. measuring and calculating the horizontal distance $x_{i+1}$ between the tallest wind turbine $f_a$ and the new base point, and the parallel parameter $x_{i+1//}=310$ m, the vertical parameter $x_{i+1\perp}=580$ m, and the relative height difference $h_{i+1}=95$ m. looking for the highest terrain point on the perpendicular bisector within the range of $x_{i+1}$ to $2r_1$ from the base point. measuring the horizontal distance $x_{3\perp}=200$ m between this point and the tallest wind turbine. by $(R_1+h_{i+1}-H_3')^2+(x_{3\perp})^2=R_1^2$ calculating the relative height difference $H_3'$ of the tip of the PLP at this point, $H_3'=99$ m. calculating the height difference $H_3=78$ m between the tip of the PLP and the ground. installing the third PLP and update the radius $$R_2 = \frac{h_w + H_3}{4\cos^2\theta}$$

of the protection surface.

step5. by installing the third PLP mentioned above, the protection of the area in FIG. 8, that is, some surrounding wind turbines, is achieved. repeating the above operations until the entire wind farm is covered.

FIG. 8 has the same distance markings as FIG. 7. Combining the embodiment and FIG. 7, it can be known that when the 1 #PLP acts alone, it forms a "point" protection and can protect the wind turbines within a radius of 138 m centered on it. Through the calculation of the protection range of the wind turbine $f_1$, the 1 #PLP and the 2 #PLP in the due east direction form a "line" protection and can protect the wind turbines within a line segment range of 755 m. Through the calculation of the protection range of the wind turbine $f_2$, the perpendicular line of the line segment of the 1 #PLP and the 2 #PLP towards the north intersects with the 3 #PLP, and the length of the perpendicular line segment is 780 m. The three PLPs form a "face" protection. Through the direction and distance parameters, FIG. 8 presents the protection range in FIG. 7 in the form of a top view. Combining with the rolling sphere method, it is known that in practical applications, the protection ranges of the above three PLPs will be larger than those shown in FIG. 8. Except for the "point" protection range of the 1 #PLP, other areas will also extend appropriately outwards. The protection range drawn here is intended to illustrate the embodiment in combination with FIG. 7.

It can be seen from FIG. 7 that compared with the method described in the PLP installation regulations, the protection range of this method is expanded from points and lines to surfaces, and the protection range is larger, effectively making up for the protection loopholes at high altitudes. Meanwhile, the layout of PLP points is more reasonable, realizing the reliable protection of the wind farm.

The above has described the specific implementation manners of the present invention in detail in combination with the accompanying drawings. However, the present invention is not limited to the above implementation manners. Within the knowledge scope of those of ordinary skill in the art, various changes can also be made without departing from the purpose of the present invention.

The invention claimed is:
1. An optimized placement method for a Plasma Lightning Protector (PLP) in a plateau and mountain wind farm, comprising:
step 1: starting from outermost wind turbines in the plateau and mountain wind farm, and measuring and calculating parameters of wind turbines;
statistically analyzing a height $h_w$ of the wind turbines in the plateau and mountain wind farm as well as a distribution range of the wind turbines in the plateau and mountain wind farm, starting from the outermost wind turbines in the plateau and mountain wind farm, looking for a highest terrain position within an area towards a center of the plateau and mountain wind farm as an installation point of a first PLP, measuring a surface height difference $\Delta h$ between a highest terrain point and a bottom of the outermost wind turbines as well as a horizontal distance $x_1$ between the highest terrain point and the bottom of the outermost wind turbines, and calculating a relative height difference $h_1$ of the wind turbines;
wherein according to a division based on a topographic position index (TPI), a position where a ratio of the TPI to an elevation difference of a target neighborhood within the area is the largest is the highest terrain position;
step 2: installing the first PLP to protect the outermost wind turbines;
calculating a height difference $H_1$ between a tip of the PLP at the installation point of the first PLP and ground, installing the first PLP accordingly, and determining a radius R of a protection surface;
step 3: combining parameters of the first PLP and parameters of a tallest wind turbine within the area adjacent to a central side of the plateau and mountain wind farm, and installing a second PLP to protect the wind turbines within a connection range;
taking the installation point of the first PLP as a base point, searching for the tallest wind turbine $f_1$ in a sector area with a horizontal radius r in a direction of the center of the plateau and mountain wind farm, measuring and calculating a horizontal distance $x_i$ between the tallest wind turbine $f_1$ and the installation point of the first PLP as well as a surface height difference $\Delta h_1$ between the tallest wind turbine $f_1$ and the installation point of the first PLP, then calculating a relative height difference $h_i$, looking for the highest terrain point on a ray from the base point to the tallest wind turbine $f_1$ within a range of $x_i$ to $2r$ from the base point, measuring a horizontal distance $x_2$ between the highest terrain point and the tallest wind turbine $f_1$ and a surface height difference $\Delta h_2$ between the highest terrain point and the base point, calculating a relative height difference $H_2'$ of the tip of the PLP at the highest terrain point, calculating a height difference $H_2$ between the tip of the PLP at the highest terrain point and the ground, installing the second PLP, and updating the radius of the protection surface to $R_1$;
step 4: combining parameters from the step 3 and parameters of the tallest wind turbine in a vertical direction area of a plane where the first PLP and the second PLP are located, and installing a third PLP to protect the wind turbines within an area formed by three points;

taking the tallest wind turbine $f_1$ in the step 3 as a new base point, updating the horizontal radius to $r_1$, looking for a tallest wind turbine $f_1$ in a sector area in a direction of a perpendicular bisector of the plane where first and second PLP installation points are located, measuring a horizontal distance $x_{i+1}$ between the tallest wind turbine $f_2$ and the new base point, as well as a surface height difference $\Delta h_{i+1}$ between the tallest wind turbine $f_2$ and the new base point, calculating a relative height difference $h_{i+1}$, looking for a highest terrain point on the perpendicular bisector within a range of $x_{i+1}$ to $2r$ from the new base point, measuring a horizontal distance $x_3$ between the highest terrain point and the tallest wind turbine $f_2$ and a surface height difference $\Delta h_3$ between the highest terrain point and the new base point, calculating a relative height difference $H_3'$ of the tip of the PLP at the highest terrain point and a height difference $H_3$ between the tip of the PLP at the highest terrain point and the ground, and installing the third PLP and updating the radius of the protection surface to $R_2$, wherein the horizontal distance $x_3$ comprises a perpendicular parameter $x_{3\perp}$ and a parallel parameter $x_{3//}$;

step 5: repeating an operation in the step 4 and installing PLPs until an entire wind farm is covered; and taking the tallest wind turbine $f_2$ in the step 4 as the base point, repeating the operation in the step 4 and installing a next PLP, and keeping repeating a process until the entire wind farm is covered.

2. The optimized placement method for the PLP in the plateau and mountain wind farm according to claim 1, wherein the relative height difference $h_1$ of the wind turbines in the step1 is calculated by the following formula:

$$h_1 = h_w - \Delta h_1.$$

3. The optimized placement method for the PLP in the plateau and mountain wind farm according to claim 1, the height difference $H_1$ between the tip of the PLP at the installation point of the first PLP and the ground and the radius R of the protection surface in the step 2 are solved by simultaneously solving the following equations:

$$R = \frac{H_1}{2\cos^1 \theta};$$

$$(R-h_1)^2 + (H_1 \tan\theta - x_1)^2 = R^2; \text{ and}$$

wherein $\theta$ is a protection angle provided by PLP installation regulations, and a value range of $\theta$ is from 84° to 86°.

4. The optimized placement method for the PLP in the plateau and mountain wind farm according to claim 3, wherein in the step 3, the relative height difference $h_i = h_w - \Delta h_1$, the height difference $H_2$ between the tip of the PLP and the ground are calculated as $H_2 = H_2' - \Delta h_2$, and the horizontal radius r is calculated by the following formula:

$$r = H_1 \tan\theta.$$

wherein the relative height difference $H_2'$ of the tip is calculated by the following formula:

$$(R + h_1 - H_2')^2 + x_2^2 = R^2;$$

updating the radius $R_1$ of the protection surface through a height of a base point object above the ground and a height of a required PLP above the ground:

$$R_1 = \frac{H_1 + H_2}{4\cos^2 \theta}.$$

5. The optimized placement method for the PLP in the plateau and mountain wind farm according to claim 3, wherein in the step 4, the relative height difference $h_{i+1} = h_w - \Delta h_{i+1}$, the height difference $H_3$ between the tip of the PLP and the ground is calculated as $H_3 = H_3' - \Delta h_3$, and the horizontal radius $r_1$ is updated according to the following formula:

$$r_1 = \frac{(h_w + H_2)}{2} \tan\theta$$

the relative height difference $H_3'$ of the tip is calculated by the following formula:

$$(R_1 + h_{i+1} - H_3')^2 + (x_{3\perp})^2 = R_1^2; \text{ and}$$

updating the radius $R_2$ of the protection surface through a height of a base point object above the ground and a height of a required PLP above the ground:

$$R_2 = \frac{h_w + H_3}{4\cos^2 \theta}.$$

* * * * *